UNITED STATES PATENT OFFICE.

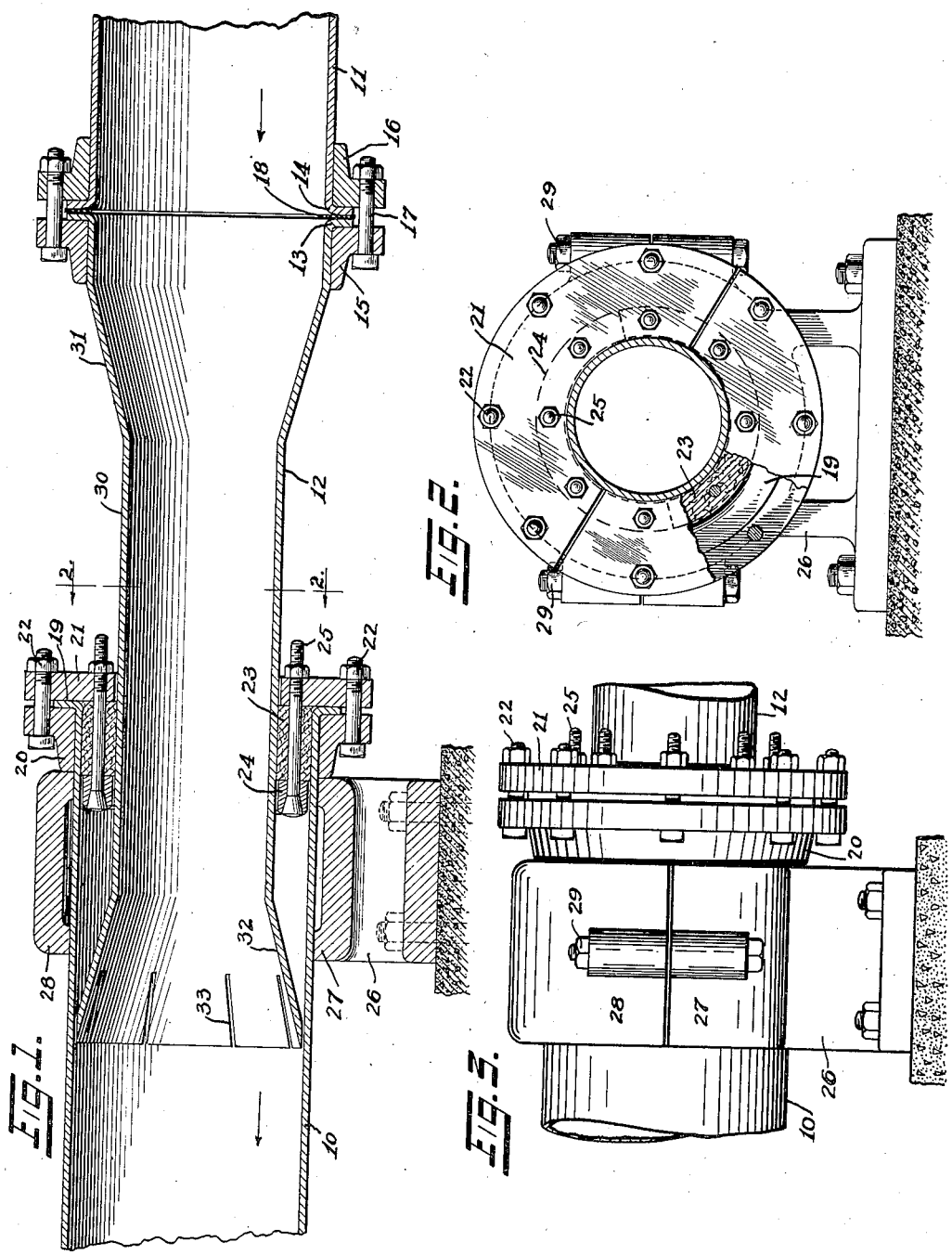

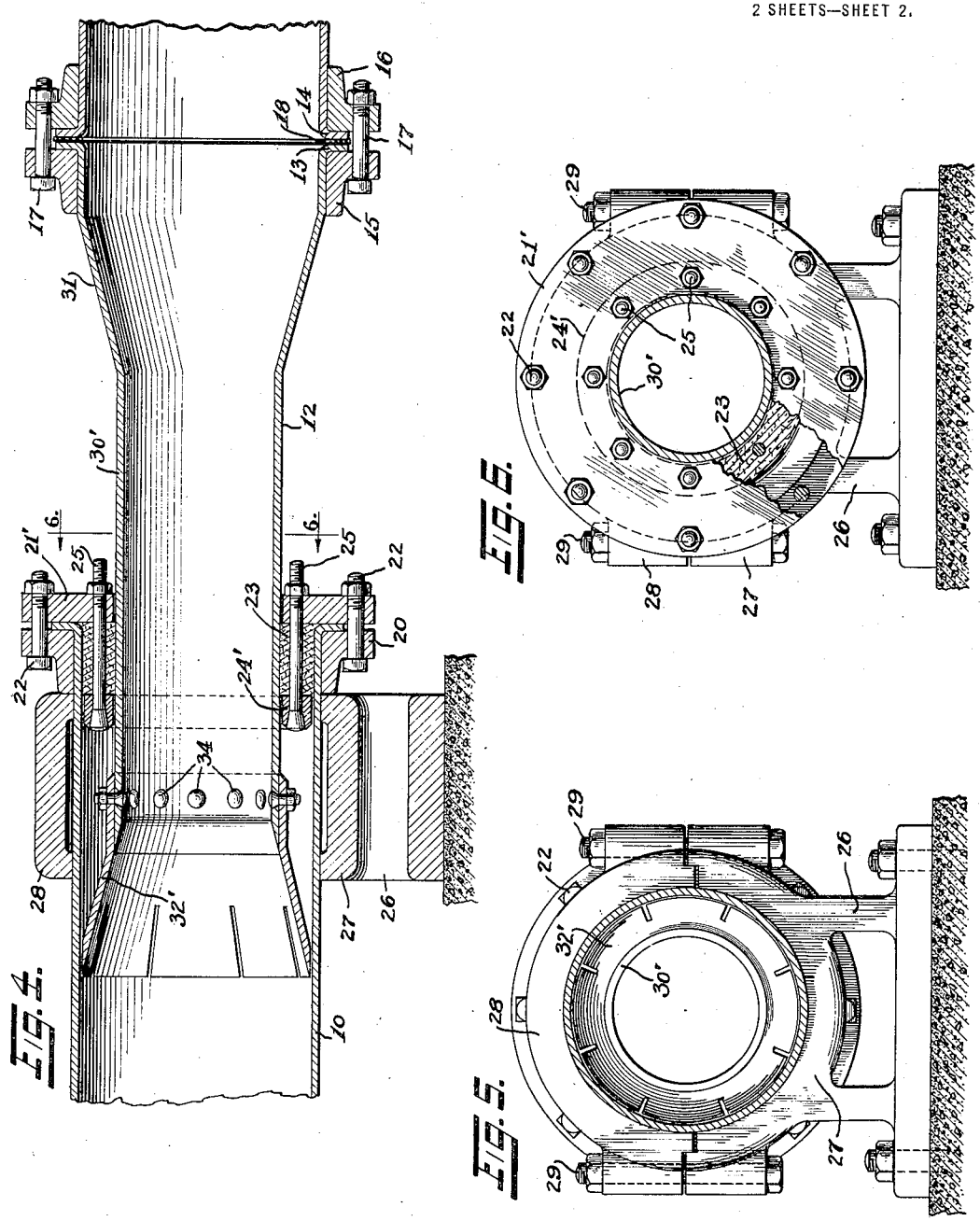

FRANCIS H. RICHARDS, OF HARTFORD, CONNECTICUT.

EXPANSION JOINT.

1,420,217. Specification of Letters Patent. Patented June 20, 1922.

Application filed December 11, 1918, Serial No. 266,329. Renewed August 26, 1921. Serial No. 495,716.

*To all whom it may concern:*

Be it known that I, FRANCIS H. RICHARDS, a citizen of the United States, residing in Hartford, in the county of Hartford and State of Connecticut, have invented certain new and useful Improvements in Expansion Joints, of which the following is a specification.

This invention relates to expansion joints in general and more especially to those of the slip-joint type disclosed in my co-pending application, Serial No. 240,249, renewed June 15, 1918.

Among the main objects of the present invention it is aimed to provide an expansion joint construction in which the main parts may with expediency be composed of wrought metal. To this end, the present invention comprehends an expansion joint in which the end of one of the pipe lengths forms a piston chamber for a contracted tubular extension which is properly secured to another pipe length and which together co-operate to take advantage of the well-known principle (an instance of which is found in the "Venturi meter"), that in a long pipe in which a large volume of fluid is moving steadily, a short length of the pipe may be considerably reduced in size without materially increasing the resistance to the forward flow of the fluid.

The invention further comprehends an expansion joint in which the normal diameter of the pipe lengths in which the expansion joint is provided will not be augmented in any portion thereof to which end it is aimed, of two pipe lengths, to provide one of the pipe lengths with a Venturi forming portion slidably mounted in the other pipe length.

The present invention also comprehends an expansion joint construction in which the number of connecting joints, or flange connections, are reduced to a minimum.

A particular feature of the present invention is a construction of expansion joint having a packing on which the pressure of the fluid flowing through the same and appurtenant parts may be so received as to tightly and effectively aid in pressing the packing in place.

Another feature afforded by the present invention arises in the provision of a slidable member less than rigid which will co-operate in the Venturi effect produced without in any way affecting the efficiency of the device as an expansion joint.

A particular advantage made possible with applicant's invention is the convenient and ready disassembling of the expansion joint parts whereby the main pipe lengths are required to be disturbed but little if at all.

These and other features, capabilities and advantages of the invention will appear from the subjoined detail description of specific embodiments thereof illustrated in the accompanying drawing in which—

Figure 1 is a longitudinal section of one embodiment.

Fig. 2 is a transverse section on the line 2—2 of Fig. 1.

Fig. 3 is an elevation of a portion of the embodiment illustrated in Fig. 1.

Fig. 4 is a longitudinal section of another embodiment.

Fig. 5 is an end elevation of the embodiment illustrated in Fig. 4.

Fig. 6 is a transverse section on the line 6—6 of Fig. 4.

In the embodiment illustrated in Figs. 1 to 3 inclusive, there is shown a construction in which the two main pipe lengths 10 and 11 co-operate with the short length 12 and appurtenant parts to form an expansion joint. These three pipe lengths 10, 11 and 12 may with expediency be composed of wrought metal and thus afford a particular feature of the invention.

When made of wrought metal as aforesaid, the positioning of the pipe lengths 11 and 12 where joined are preferably flanged as shown at 13 and 14 respectively with opposing rings 15 and 16 mounted on the pipe lengths 11 and 12 respectively adjacent to the flanges 13 and 14 and secured to one another by the bolts 17. Preferably the opposing flanges 13 and 14 have a suitable packing such as an annular corrugated soft metal member 18 secured between them.

The end of the pipe length 10 is also provided with a flange 19 to facilitate securing the expansion joint packing in place, to which end a ring 20 is mounted on the pipe length 10 adjacent to the flange 19 and an annular member 21 disposed on the outer face of said flange 19 and secured in place by the bolts 22 which secured the flange 19 between the ring 20 and the annular member 21 and thereby secure the annular member 21 in place. The annular member 21 overhangs the inner periphery of the pipe length 10 adjacent to which overhanging portion and interiorly thereof is disposed the packing 23 composed of a suitable flexible or yieldable material which is clamped between the inner ring 24 and the overhanging portion of the annular member 21 by the bolts 25. From the foregoing it will be seen that the packing 23 with its members 21 and 24 may be removed by merely loosening the bolts 25.

The ring 24 and annular member 21 are preferably made in halves as shown in Fig. 2 to facilitate assembling the same when the short pipe length 12 has the formation illustrated in Fig. 1.

In use, it is preferable to support the end of the pipe length 10 adjacent the packing 23 for which purpose in Fig. 1 there is shown a supporting cradle member 26, having the curved seat 27 which registers with the section 28 which is properly secured to the seat 27 by the bolts 29 thereby to both support and anchor the pipe length 10 in place.

The pipe length 12 has a restricted portion 30 the exterior of which forms a sliding surface for the packing 23. The pipe length 12 as shown in Fig. 1 has an outwardly flaring portion 31 flaring outwardly from the restricted portion 30 to the diameter of the pipe length 11 preferably in proximity to its flange 13 as shown. The other end of the pipe length 12 beyond the packing 23 is provided with an outwardly flaring portion 32 which flares outwardly from the restricted portion 30 to a diameter slightly less than the interior diameter of the pipe length 10. From the foregoing it will be seen that no portions of the expansion joint have a diameter that exceeds the diameter of the pipe lengths 10 and 11 and that the portion of the pipe length 12 which co-operates with the packing 23 in fact is restricted having a decidedly smaller diameter than the diameter of the pipe lengths 10 and 11 whereby the friction and wearing surfaces of the expansion joint thus formed are materially reduced and the pressure as is well known with Venturi systems also proportionately reduced whereby there is no occasion whatever for using any reinforced portions at the expansion joint.

In order to allow for any slight defect of alinement between the pipe lengths 10 and 11 which may arise from the settling of the foundation supporting the same or the like, the packing 23 being yieldable will readily accommodate any such variations without diminishing its packing efficiency. In order to further render the device yieldable or self-adjusting the end of the flared portion 32 is provided with incisions 33. These incisions 33 not only assist in rendering the flared portion 32 yieldable but also aid in permitting the free passage of the fluid to the ring 24 whereby it is free to exercise a pressure on the ring 24 to in turn aid in effectively pressing the packing 23 in place. On account of the lack of abrupt obstructions in the passage of the fluid from right to left of the device as shown in Fig. 1, it is preferable that the fluid take such direction. From the foregoing it will be seen that as a means for considerably reducing the endwise pressure on the pipe line, due to the difference in internal diameter of the restricted portion 30 relatively the internal diameter of the pipe lengths 10 and 11, advantage is taken of the well known principle (an instance of which is found in the "Venturi meter"), that in a long pipe in which a large volume of fluid is moving steadily, a short length of the pipe may be considerably reduced in size without materially increasing the resistance to the forward flow of the fluid.

In the embodiment illustrated in Figs. 4, 5 and 6, the restricted portion 30' which corresponds to the restricted portion 30 of the embodiment illustrated in Fig. 1 is provided with an outwardly flaring portion 32' which is detachably secured, preferably by means of the bolts 34 illustrated, and that in view thereof, the annular member 21' and ring 24', which correspond to the annular member 21 and ring 24 of the embodiment illustrated in Fig. 1 may be in one piece.

It is obvious that various changes and modifications may be made to the details of construction without departing from the general spirit of the invention.

I claim:

1. In an expansion joint, the combination with two main pipe lengths, of a short pipe length restricted at its intermediate portion and outwardly flaring portions at either end of said short pipe length, one of said outwardly flaring portions being secured to one of said main pipe lengths, the other of said outwardly flaring portions being slidably mounted in the main pipe length.

2. In an expansion joint, the combination with two main pipe lengths, of a short pipe length restricted at its intermediate portion and outwardly flaring portions at either end of said short pipe length, one of said outwardly flaring portions being secured to one of said main pipe lengths, the other of said outwardly flaring portions being slidably mounted in the main pipe length, and packing secured to the end of said other main pipe length and encircling the restricted portion of said short pipe length.

3. In an expansion joint, the combination with two main pipe lengths, of a short pipe length restricted at its intermediate portion and outwardly flaring portions at either end of said short pipe length, one of said outwardly flaring portions being secured to one of said main pipe lengths, the other of said outwardly flaring portions being slidably mounted in the main pipe length and being less than rigid to co-operate with said other main pipe length to accommodate any changes in alinement of the main pipe lengths.

4. In an expansion joint, the combination with two main pipe lengths, of a short pipe length restricted at its intermediate portion and outwardly flaring portions at either end of said short pipe length, one of said outwardly flaring portions being secured to one of said main pipe lengths, the other of said outwardly flaring portions being slidably mounted in the main pipe length, and having incisions therein to afford a yieldable end.

5. In an expansion joint, the combination with two main pipe lengths, of a short pipe length secured at one end to one of said main pipe lengths, the other end of said short pipe length being slidable in said other main pipe length, said short pipe length being restricted at its intermediate portion and flaring outwardly at either end to conform to the diameter of the main pipe lengths, and a packing secured to the end of said other main pipe length and encircling the restricted portion of said short pipe length.

6. In an expansion joint, the combination with two main pipe lengths, of a short pipe length restricted at its intermediate portion and outwardly flaring portions at either end of said short pipe length, one of said outwardly flaring portions being secured to one of said main pipe lengths, the other of said outwardly flaring portions being slidably mounted in the main pipe length, packing secured to the end of said other main pipe length and encircling the restricted portion of said short pipe length, there being incisions in the slidably mounted outwardly flaring portion to facilitate the passage of the fluid in said pipe lengths to said packing and exercise pressure thereon.

7. In an expansion joint, the combination with two main pipe lengths, of a short pipe length secured at one end to one of said main pipe lengths, the other end of said short pipe length being slidable in said other main pipe length, said short pipe length being restricted at its intermediate portion and flaring outwardly at either end to conform to the diameter of the main pipe lengths, an annular member secured to the end of said other main pipe length and overhanging the inner periphery thereof, and a packing secured to the inside of said overhanging portion to encircle the restricted portion of said short pipe length.

8. In an expansion joint, the combination with two main pipe lengths, of a short pipe length secured at one end to one of said main pipe lengths, the other end of said short pipe length being slidable in said other main pipe length, said short pipe length being restricted at its intermediate portion and flaring outwardly at either end to conform to the diameter of the main pipe form, an annular member secured to the lengths, an annular member secured to the end of said other main pipe length and overhanging the inner periphery thereof, a packing secured to the inside of said overhanging portion to encircle the restricted portion of said short pipe length, the fluid passing through said pipe lengths being free to exercise pressure on said packing and thus aid in effectively pressing the same in place.

9. In an expansion joint, the combination with two main pipe lengths, of a short pipe length secured at one end to one of said main pipe lengths, the other end of said short pipe length being slidable in said other main pipe length, said short pipe length being restricted at its intermediate portion and flaring outwardly at either end to conform to the diameter of the main pipe lengths, an annular member secured to the end of said other main pipe length and overhanging the inner periphery thereof, a ring disposed inside of said other main pipe length, a packing, and bolts for securing said packing between said ring and said overhanging portion to encircle the restricted portion of said short pipe length.

10. In an expansion joint, the combination with two main pipe lengths, of a short pipe length secured at one end to one of said main pipe lengths, the other end of said short pipe length being slidable in said other main pipe length, said short pipe length being restricted at its intermediate portion and flaring outwardly at either end to conform to the diameter of the main pipe length, an outwardly extending flange on the end of said other main pipe length, a ring on said other main pipe length, an annular member, bolts for securing said flange between said ring and said annular member, a portion of said annular member overhanging the inner periphery of said other main pipe length, a ring disposed inside of said other main pipe length, a packing, and bolts for securing said packing between said ring and said overhanging portion to encircle the restricted portion of said short pipe length.

11. In an expansion joint, the combination with two main pipe lengths, of a short pipe length restricted at its intermediate portion and outwardly flaring portions at either end of said short pipe length, one of said outwardly flaring portions being secured to one of said main pipe lengths, the other of said outwardly flaring portions being slidably mounted in the main pipe length and detachably secured to said short pipe length.

12. In an expansion joint, the combination with two main pipe lengths, of a short pipe length restricted at its intermediate portion and outwardly flaring portions at either end of said short pipe length, one of said outwardly flaring portions being secured to one of said main pipe lengths, the other of said outwardly flaring portions being slidably mounted in the main pipe length and detachably secured to said short pipe length, an outwardly extending flange on the end of said other main pipe length, a ring on said other main pipe length, a one-piece annular member, bolts for securing said flange between said ring and said annular member, a portion of said annular member overhanging the inner periphery of said other main pipe length, a ring disposed inside of said other main pipe length, a packing, and bolts for securing said packing between said ring and said overhanging portion to encircle the restricted portion of said short pipe length.

FRANCIS H. RICHARDS.